Feb. 8, 1938. A. H. BENNETT 2,107,685
BRAKE
Filed Oct. 29, 1936 2 Sheets-Sheet 2

Inventor
Arthur H. Bennett
By Clarence A. O'Brien
Hyman Berman
Attorneys

Patented Feb. 8, 1938

2,107,685

UNITED STATES PATENT OFFICE 2,107,685

BRAKE

Arthur H. Bennett, Logansport, Ind.

Application October 29, 1936, Serial No. 108,295

2 Claims. (Cl. 188—78)

This invention has reference to brakes and more especially to an automobile foot brake.

The objects of the invention are to provide: a novel system of leverage so assembled and related that with lesser foot pressure upon the foot pedal than heretofore required in applying the brakes a much greater pressure is effected at the friction or braking surface in the brakes; to provide for an equal distribution of braking pressure to the brake shoes; to guide and direct the movement of the braking shoes along rectilinear lines and thereby obtaining a maximum of smoothness and steadiness to the action of the brake and consequently to the vehicle; to provide novel brake shoe adjusting means for preventing contact between parts not intended to be used as braking surfaces; and, in general to provide a simplified and improved assembly facilitating interchangeability of parts, and rapid assembly and disassembly thereof.

With the above objects in view, the invention consists in the novel arrangement, construction and combination of parts hereinafter more fully described with reference to the accompanying drawings wherein:—

In common with conventional foot brake assemblies, the present device provides a brake housing consisting of a stationary part for brake support 1 and a rotating part or wheel brake drum 2 between which is housed the brake shoes 3—3' and the brake shoe mounting and actuating unit hereinafter pointed out and described. Each brake shoe is provided with the usual facing 4 for frictional contact with the brake drum 2 and in the present device, is free to be moved along rectilinear lines for effecting the engagement and disengagement of the spacing with the drum.

Figure 1:
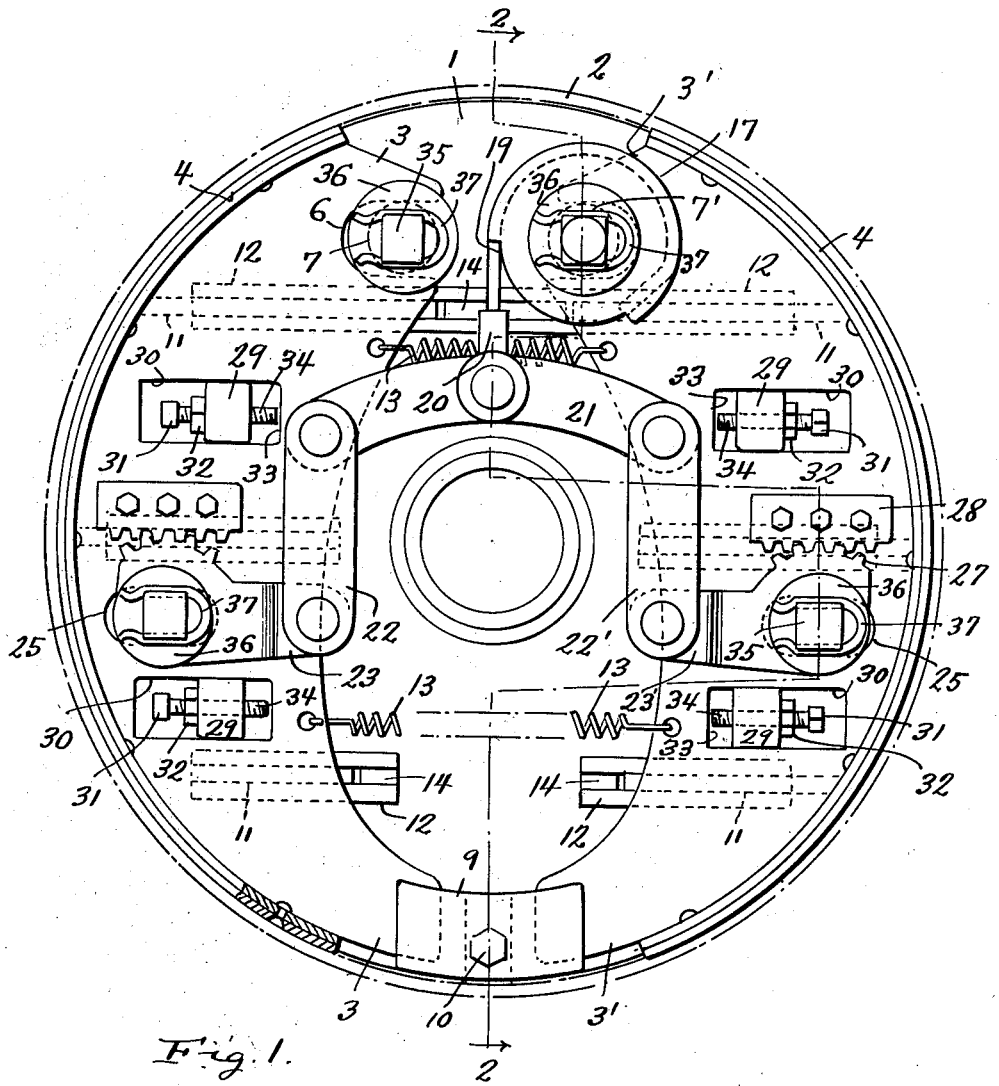
Figure 1 is a side elevation of the improved brake assembly.
Figures 2, 3:
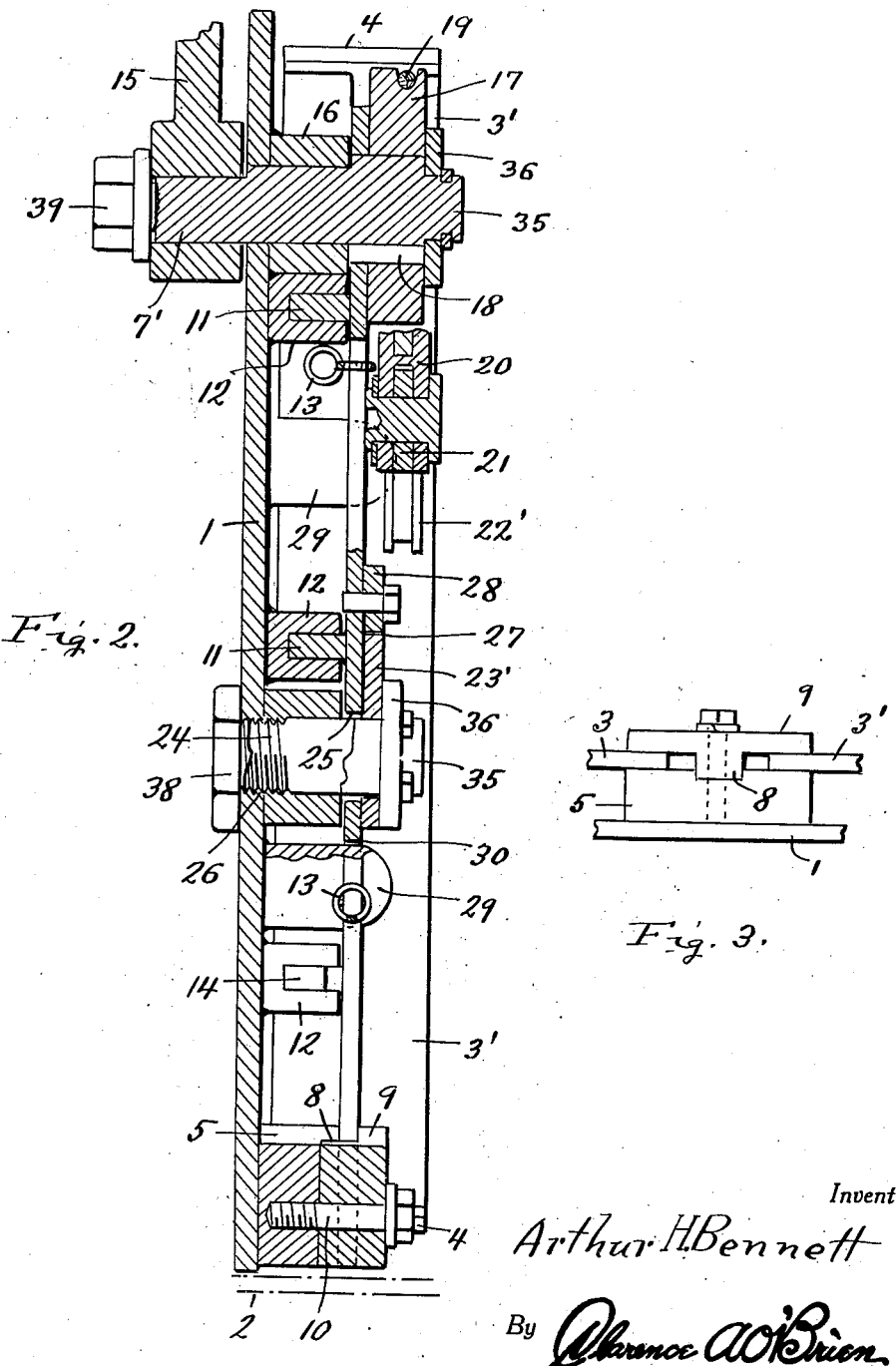
Fig. 2 is a section on line 2—2 of Fig. 1.
Fig. 3 is a detail view of the brake shoe anchor guide assembly.

To this end, the brake shoes have their lower ends slidably engaged in an anchoring guide 5 at the bottom of the brake housing and have their upper ends notched, as at 6, to have a slide bearing on anchoring members 7—7'. The anchoring guide body 5 is integral with or fixed to the inner side of the brake support 1 and is grooved centrally and vertically of its inner face to seat the spacing rib 8 on the inner face of the outer detachable guide portion 9; the latter being secured to the body by a screw bolt 10, as illustrated in Figs. 2 and 3. A plurality of lateral guides, consisting of male guide members or ribs 11 on the inner faces of the brake shoes and sliding in female guide members or channels 12 on the brake support 1, are provided at spaced points longitudinally of the brake shoes to serve as directional mediums for all movements of the shoes and for all braking forces: so directing said forces as to obtain the maximum braking effect while at the same time providing for an equal distribution of all braking forces by arresting chatter, back lash, or grabbing of the brake unit. When the brake is not in operation, the brake shoe facings are held clear of the brake drum by the brake shoe return springs 13; the latter coupling the brake shoes together and contracting to draw the shoes inwardly when the brake pedal is released until the ribs 11 rest against backs 14 inset at the inner extremities of the guide channels 12, excluding the middle set of guides.

The brake shoes are operated to force the brake shoe facings against the brake drum by pressure transmitted from the foot pedal to a brake operating lever arm 15 fixedly mounted on the exterior end of the brake shoe anchoring member 7'; the latter being a shoulder bolt journalled for rotation in the brake support 1 and having a support in an annular boss or bearing 16 on the inner face of the brake support 1 with its opposite end disposed through and beyond the notched upper extremity of the brake shoe 3' and supporting a grooved cable drum 17 keyed or otherwise fixed thereon as shown at 18. Nesting in the groove of the drum is a short length of flexible cable 19 having one terminal thereof connected with the drum and the other terminal attached to a link 20 which is pivotally connected to an equalizing arm 21 intermediate the ends of the arm. The ends of the equalizing arm are connected by links 22—22' to the inner extremities of gear levers 23—23' disposed laterally and substantially centrally of the outer faces of the brake shoes; each gear lever being fulcrumed at its gear bearing end on the outer portion of a shoulder bolt 24 extending through a large clearance opening 25 in the shoe with its inner portion screwed to the brake support 1, as indicated at 26. The gear teeth 27 of the gear levers mesh with the teeth of gear racks 28 securedly attached to the brake shoes 3—3'. Hence, when the lever arm 15 is moved in a direction winding the cable 19 around the drum 17, the equalizing arm 21 will be moved upwardly and by reason of its linkage connection with the gear levers 23—23' will actuate the latter to slide the brake shoes outwardly against the resistance of the return springs 13 and force the brake shoe facings against the brake drum. All movement and forces transmitted to the equalizing arm by the cable through the terminal links are equally transmitted to the gear lever arms and to the brake shoe gear racks so that the pressure applied to the brake drums by being contacted by one brake shoe facing is equal to the contact pressure of the other brake shoe facing.

An additional feature of the device is the provision of adjustable stops to prevent engagement of the brake shoes or the brake shoe facing rivet with the rotating brake drums in the event the brake facings are worn away. Two of such stops are associated with each brake shoe and since all are of similar construction, a description of one will suffice. The stops consist of a post 29 secured at its base to the inner face of brake support 1 and extending through an opening 30 in the brake shoe; the opening being elongated in the direction of movement of the brake shoe so that the latter may slide relatively to the post. Extending through the post and in the center plane of the brake shoe is a tapped hole whose axis lies parallel with the line of movement of the shoe and screwed in said hole is a stop screw 31 provided with a binding nut 32. When the brake shoe is resting against stops 14, a gap or space is left between the inner edge 33 of the opening 29 and the adjacent end 24 of the stop screws. This gap is closed when the edge 33 abuts the end of the screw in the outward position of the brake shoe and it is obvious that by proper adjustment of the stop screw, the edge 33 may be caused to abut therewith for preventing any contact of either the brake shoe or the brake shoe facing rivet with the rotating drum.

This provision is of great value in protecting and preventing wear between parts never intended to be used as brake surfaces.

To provide for convenience and rapid assembly and disassembly of such parts as are necessary to be removed to replace the brake facing, each of the brake shoe anchoring members 7—7' and the gear lever fulcrum member 24 terminates at its outer end in a square shoulder 35 of sufficient height to receive thereon a washer 36 having also a square opening to fit the square shoulder. The shoulder 35 is grooved on two opposite sides immediately above the surface of the washer to receive the legs of a U-shaped clip 37 of spring steel which is so formed as to snap into position and be self-retaining on the shoulder. To remove these clips, any convenient tool, such as a screw driver, is placed inside the bight portion of the clip and tapped with a hammer in a general direction away from the shoulder on which it is mounted. Upon removing the clips 37, washers 36, screw 10, and guide member 9 the brake shoes and other necessary parts may be readily removed from the assembly.

The design and construction of the brake elements and the symmetrical location of all parts on the support member 1 makes it possible for any brake shoe to be interchangeable with any other. There is no left or right to the brake shoes, since either shoe may be used on one side or the other of the brake drum. The anchor bolt assembly 7 is essentially the same as the lever gear bolt assembly 24 (except for the gear lever arm) and the brake operating bolt assembly 7'.

Fulcrum bolts 24 may, if so desired, be provided with a binding nut 38 for more secure attachment to the brake housing and the nut 39 may be provided on the exterior extremity of shoulder bolt 7'. The cable terminal link, equalizing arm, gear lever arms, and coupling links are riveted together at their unions with shoulder rivets to permit freedom of action.

Having thus described the invention, what I claim is:—

1. A brake shoe comprising a drum, brake shoes having facings riveted on the surfaces thereof and being movable to place the facings in and out of braking contact with the said drum, means for guiding and constraining the movement of the brake shoes along rectilinear lines, and adjustable means limiting the movement of the said brake shoes to prevent engagement of the brake shoes or the brake shoe facing rivets with the drum in the event the brake shoe facings have worn away, and means for moving said brake shoes including a cable drum mounted within the brake drum, an equalizing arm arranged within the brake drum, a cable fixed at one end to the cable drum and at the other end to the intermediate portion of said equalizing arm, motion transmitting means operatively connecting the equalizing arm with the brake shoes, means for turning said cable drum, and resilient means connecting the brake shoes.

2. A brake shoe comprising a brake housing consisting of a stationary support and a rotatable brake drum, brake shoes provided with facings and mounted in said housing to be moved along rectilinear lines for effecting the engagement and disengagement of the brake shoe facings with the said drum, coacting guides on the said support and brake shoes respectively for guiding and directing the movement of the brake shoes, gear racks on the brake shoes, gear levers meshing with said racks and fulcrumed to the support, a cable drum, an equalizing arm, a cable fixed at one end to the drum and at the other end to the intermediate portion of the equalizing arm, links connecting the equalizing arm and the said gear levers, means for turning said drum, and return springs connecting the said brake shoes.

ARTHUR H. BENNETT.